(12) United States Patent
Davis et al.

(10) Patent No.: US 7,602,132 B2
(45) Date of Patent: Oct. 13, 2009

(54) METHODS AND SYSTEM FOR MOTOR DRIVE INFORMATION CAPTURE

(75) Inventors: Wayne Ronald Davis, Cambridge (CA); Manish Pande, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 7 days.

(21) Appl. No.: 11/535,675

(22) Filed: Sep. 27, 2006

(65) Prior Publication Data
US 2008/0074075 A1    Mar. 27, 2008

(51) Int. Cl.
H02P 27/04    (2006.01)

(52) U.S. Cl. ......................... 318/558; 318/565; 388/909

(58) Field of Classification Search ......... 318/162–164, 318/558, 565, 568.24, 650–654, 798–812; 388/903, 909
See application file for complete search history.

(56) References Cited

U.S. PATENT DOCUMENTS

| | | | | |
|---|---|---|---|---|
| 4,289,997 | A * | 9/1981 | Jung et al. | 318/113 |
| 4,931,712 | A * | 6/1990 | DiGiulio et al. | 318/625 |
| 4,945,501 | A * | 7/1990 | Bell et al. | 702/95 |
| 5,534,759 | A * | 7/1996 | Evans et al. | 318/139 |
| 5,602,749 | A * | 2/1997 | Vosburgh | 700/174 |
| 5,680,025 | A * | 10/1997 | Bowers et al. | 318/806 |
| 5,877,707 | A | 3/1999 | Kowalick | |
| 5,903,462 | A | 5/1999 | Wagner | |
| 6,009,356 | A | 12/1999 | Monroe | |
| 6,091,236 | A * | 7/2000 | Piety et al. | 324/103 P |
| 6,167,358 | A | 12/2000 | Othmer et al. | |
| 6,186,400 | B1 | 2/2001 | Dvorkis et al. | |
| 6,211,639 | B1 * | 4/2001 | Meister et al. | 318/568.2 |
| 6,262,550 | B1 * | 7/2001 | Kliman et al. | 318/565 |
| 6,369,472 | B1 * | 4/2002 | Grimm et al. | 310/67 R |
| 6,392,692 | B1 | 5/2002 | Monroe | |
| 6,496,766 | B1 | 12/2002 | Bernold et al. | |
| 6,545,601 | B1 | 4/2003 | Monroe | |
| 6,555,984 | B1 * | 4/2003 | Rajala et al. | 318/569 |
| 6,567,283 | B2 * | 5/2003 | Welches | 363/89 |

(Continued)

FOREIGN PATENT DOCUMENTS

JP    59 162780 A    9/1984

(Continued)

OTHER PUBLICATIONS

John P. Hayes. "Introduction To Digital Logic Design", Addison-Wesley Publishing Company, New York, 1993. Page 235 shows transmission gates. Pages 395-397 show example of understanding a dynamic random-access memory (DRAM).*

(Continued)

*Primary Examiner*—Bentsu Ro
(74) *Attorney, Agent, or Firm*—Fay Sharpe LLP; Alexander R. Kuszewski (57) ABSTRACT

Methods and systems are provided for capturing and saving motor drive information in a non-volatile memory to facilitate troubleshooting and motor fault analysis. The motor drive includes a power conversion system that provides electrical power to an electric motor and a control system providing a control input to the power conversion system, and an information capture system is provided with an information capture component to capture motor drive information and a non-volatile memory component to store the captured information.

12 Claims, 4 Drawing Sheets

U.S. PATENT DOCUMENTS

| | | |
|---|---|---|
| 6,894,606 B2 | 5/2005 | Forbes et al. |
| 6,989,642 B2 * | 1/2006 | Wakefield et al. ........... 318/139 |
| 7,026,778 B2 * | 4/2006 | Aoyama et al. ............. 318/600 |
| 7,049,953 B2 | 5/2006 | Monroe |
| 7,274,576 B1 * | 9/2007 | Zargari et al. ................. 363/39 |
| 7,301,789 B2 * | 11/2007 | Wiseman ................. 363/56.12 |
| 7,352,141 B2 * | 4/2008 | Kling et al. ................... 318/66 |

FOREIGN PATENT DOCUMENTS

| | | |
|---|---|---|
| JP | 2006 101576 A | 4/2006 |
| JP | 2006 141088 A | 6/2006 |
| WO | WO 2004/079889 A | 9/2004 |

OTHER PUBLICATIONS http://www.wisegeek.com/what-should-i-consider-when-buying-portable-memory-for-my-computer? This website tells the advantage of using a portable memory card.*

European Search Report, The Hague, Nov. 27, 2007, Gusia, Sorin.

* cited by examiner

METHODS AND SYSTEM FOR MOTOR DRIVE INFORMATION CAPTURE

FIELD OF THE INVENTION

The present invention relates generally to electrical power conversion and more particularly to capturing information in a motor drive system.

BACKGROUND OF THE INVENTION

Motor drives are machines that selectively provide electrical power from a power source to an electric motor in a controlled fashion to operate the motor according to a desired profile or set point operating condition, where such motor drives typically provide for motor speed control, torque control, position control, etc. During operation of motor drive systems, certain conditions or events may cause shutdown of the drive. Examples include over voltage conditions, line power problems, and other plant disturbances, where the motor drive may be programmed to stop the motor or take some other precautionary action, such as a controlled shutdown, etc. In certain situations, it may be possible to simply reset or restart the drive once the triggering condition has subsided. In this case, however, the cause of the shut-down may remain unknown, and the same situation may subsequently reoccur, leading to increased down-time for the motor system, loss of production, and expenditure of resources trying to identify the reason for the motor drive stoppage. Other situations are possible in which plant disturbances or system component failures cause damage to the motor and/or the drive, and it may not be possible to simply reset the drive for continued operation without repairing or replacing system components. In these cases, it is desirable to address the condition or conditions that caused the failure before operating the repaired system. However, identifying the plant disturbance or device failure that caused the system to shut down is often difficult or impossible without trial and error type testing at the original site. Moreover, intermittent plant disturbances may not be revealed by such testing, and may thus cause subsequent system stoppage, possibly resulting in further damage to system devices. Therefore, a need exists for improved motor drives and systems to facilitate identification of the causes of motor drive system shutdown.

SUMMARY OF INVENTION

Various aspects of the present invention are now summarized to provide a basic understanding of the invention, where the following is not an extensive overview of the invention, and is intended neither to identify certain elements of the invention, nor to delineate the scope thereof. Rather, the primary purpose of this summary is to present some concepts of the invention in a simplified form prior to the more detailed description that is presented hereinafter. The invention provides methods and motor drive systems that provide for capture and retrievable storage of motor drive information to facilitate identification of the reasons for motor drive system shutdown or faults, and can be employed in association with any type or form of electric motors powered by a motor drive that selectively provides electrical power from a power source to the motor in a controlled fashion. The information capture system operates autonomously without user intervention or configuration using triggering events, information capture rates, and definitions that are preferably predetermined by development personal and embedded in the motor drive firmware, and may operate to preserve internal values or system states that are not otherwise externally accessible to facilitate reconstruction of the situation leading up to the triggering event.

In accordance with one or more aspects of the invention, a motor drive system is provided for operation of an electric motor. The drive includes a power conversion system, a control system, and an information capture system for capturing and storing motor drive information. The power conversion system operates to selectively provide electrical power from a power source to the motor, and the control system provides one or more control inputs to the conversion system in order to control the motor operation. The information capture system includes an information capture component, such as a processor, co-processor, or other device which operates to capture motor drive information, as well as a non-volatile memory component to store the captured information. The provision of the information capture system allows retrieval of motor drive information that may aid in identifying the cause of a system shutdown, fault condition, or other triggering event of interest. In one embodiment, the power conversion system includes a switching system comprised of a group of switching devices coupled between the power source and the motor, with the control system including a motor controller providing an output according to a desired profile or setpoint, and a switch control circuit providing switch control signals according to the controller output. The information capture system in one implementation captures and stores a given amount of motor drive information, such as several seconds or minutes worth of information samples as the drive is operated until a trigger event occurs, after which the stored information is maintained in the non-volatile memory component for subsequent retrieval. The information capture system, moreover, may operate according to any type of triggering event, such as motor drive fault conditions, watchdog timer conditions in the control system, preconfigured conditions in the control system, etc., which may be sensed by the capture system or may be signaled by the drive control system or other external source.

The motor drive information capture system may capture and store any type of information that is associated with a motor drive or operation thereof, such as current, voltage, speed, torque, or other feedback values from the power conversion system, control signal values, digital and/or analog I/O values, or internal firmware states or values from the drive control system, etc. The information, moreover, can be stored in any form of non-volatile memory, for example, battery backed RAM, flash memory, ferroelectric memory, etc. In addition, the non-volatile memory component may be physically removable from the drive, for example, a USB memory key or other removable non-volatile memory, thereby facilitating off-site analysis of the drive state and system conditions at and shortly prior to the time of the shutdown. The information capture component can be any processor, co-processor, logic, etc., which obtains the real time motor drive information in generally continuous fashion and may also capture other supplemental values with or without time stamp information during normal operation, and which updates the non-volatile memory with the most recent information. The information capture component may obtain the information from feedback I/O components or systems, from the power conversion system, and/or from the motor drive control system, or other suitable source. In one embodiment, the information is stored in a circular stack implemented in the non-volatile memory, with newly captured information overwriting the least recent entries, such that a predetermined window depth is achieved to maintain at any given time the motor drive information over the past few seconds, minutes, or other suitable time period along with other time stamped information. Thus, when a triggering event occurs, the most recent machine states and operating condition values can be preserved for subsequent analysis.

Further aspects of the invention provide a method for operating an electric motor. The method includes providing electrical power from a power source to an electric motor using a power conversion system, controlling the power conversion system according to at least one desired profile or setpoint using a control system, capturing motor drive information from at least one of the power conversion system and the control system, and storing a given amount of motor drive information in a non-volatile memory until a trigger event occurs. Additional aspects of the invention provide a system for capturing information in a motor drive, including an information capture system with an information capture component operative to capture motor drive information until a trigger event occurs, and a non-volatile memory component operatively coupled with the information capture system to receive and store the captured information.

BRIEF DESCRIPTION OF THE DRAWINGS

The following description and drawings set forth certain illustrative implementations of the invention in detail, which are indicative of several exemplary ways in which the various principles of the invention may be carried out. The illustrated examples, however, are not exhaustive of the many possible embodiments of the invention. Other objects, advantages and novel features of the invention will be set forth in the following detailed description of the invention when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout, and wherein the various features are not necessarily drawn to scale. The invention provides information capture systems and methods for operating an electric motor drive in which motor drive information is captured and stored in non-volatile memory for use in analyzing the drive and plant conditions leading up to a triggering event, such as a system fault, shutdown, device failure, etc. The invention finds utility in association with any form of motor drive system, and is illustrated and described hereinafter in the context of an exemplary switching type Ac-DC-AC motor drive powering a polyphase induction motor, although the invention is not limited to the illustrated embodiments.

Figure 1:
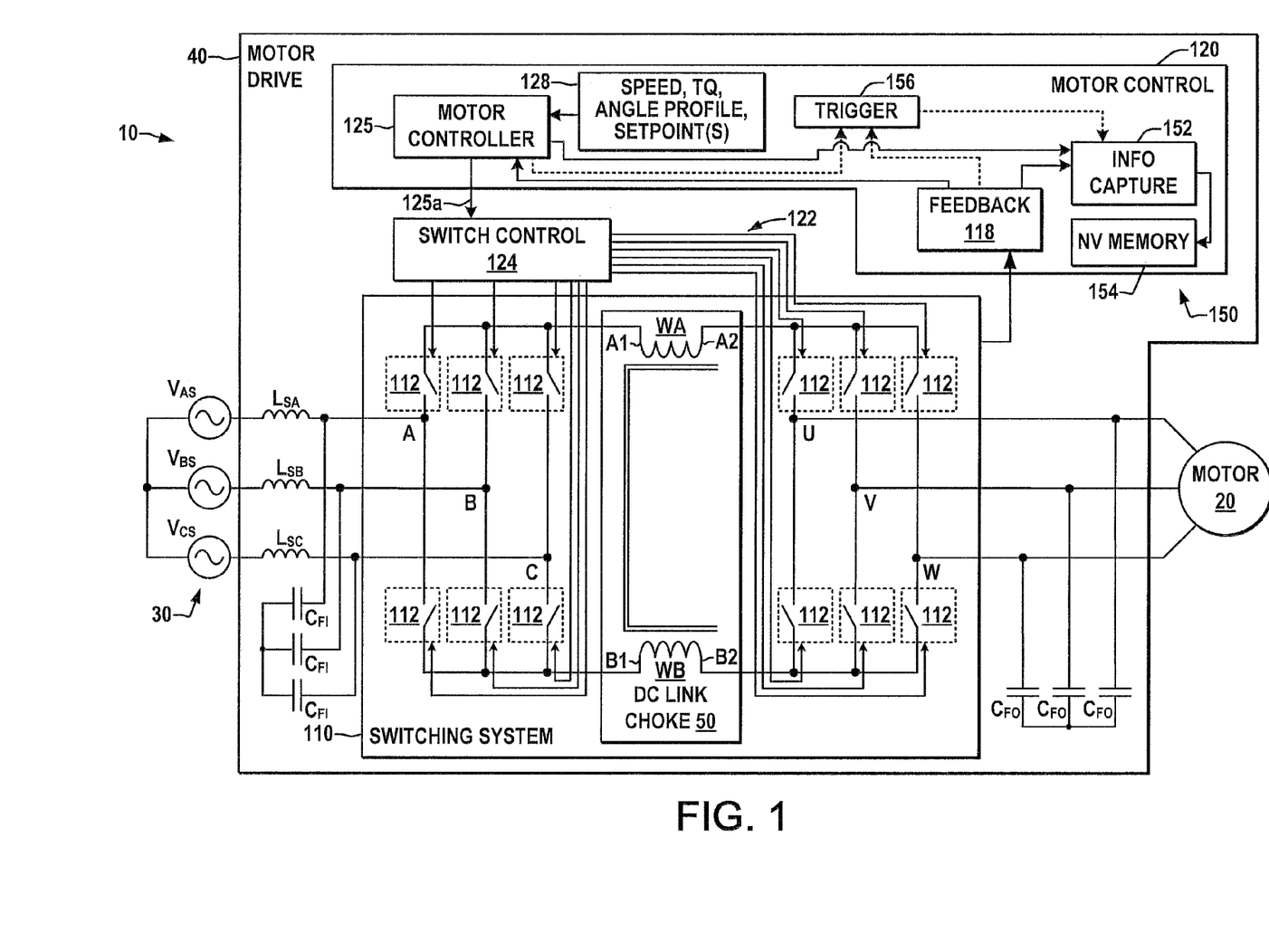
FIG. 1 is a schematic diagram illustrating an exemplary motor drive system driving an induction motor using power from a three-phase AC power source via a switching type AC-DC-AC power conversion system operated by a motor speed control system, with an information capture system capturing and storing motor drive information in a non-volatile memory in accordance with one or more aspects of the present invention.

FIG. 1 illustrates an exemplary motorized system 10 including a motor drive 40 comprising a motor control system 120 having a motor drive information capture system 150 in accordance with one or more aspects of the invention. The control system 120 includes a switch control circuit or system 124, and a motor controller 125 providing a controller output 125a as a control input to the switch control system 124 of a switching type power conversion system 110 for speed, torque, position, or other type motor control according to one or more desired profiles or set points 128. The control system 120 and the various components thereof can be implemented in any suitable hardware, software, programmable logic, etc., or combinations thereof. In operation, the motor drive 40 selectively provides electrical power to a polyphase induction motor 20 from a three phase AC power source 30 by controlled operation of the switching type power conversion system 110. The power conversion system 110 in this example is a two-stage architecture with three pairs of input switching devices 112 forming a switching regulator circuit or stage selectively switching the three-phase input power on lines A, B, C from the source 30 to provide an intermediate DC to input terminals A1 and B1 of upper and lower windings WA and WB, respectively, of a DC link choke 50. In the illustrated system 10, the motor drive 40 also includes integral line reactors $L_{SA}$, $L_{SB}$, and $L_{SC}$ in series between the input phase sources $V_{AS}$, $V_{BS}$, and $V_{CS}$ of the power source 30 and the corresponding switch circuit input nodes A, B, and C, respectively, and the illustrated drive 40 includes input filter capacitors $C_{FI}$, output filter capacitors $C_{OF}$, contactors, and/or other suitable circuitry associated with provision of power to the motor 40 (not shown), although not a requirement of the invention.

Three pairs of output switching devices 112 are controlled so as to selectively couple the DC at the choke output terminals A2, B2 to leads U, V, W, of the motor 20, and thereby to create motor winding currents for operating the motor in a controlled fashion. The switching devices 112 may be controlled according to any suitable type or form of switching scheme or schemes, such as pulse width modulation, etc., in open or closed-loop fashion, for example, with switching control signals being provided to the individual switches 112 from the switch controls 124 based on the control input signal(s) 125a from the motor controller 125 in order to implement a given desired type of motor operation, such as a desired speed, torque, position control profile or setpoint. In the illustrated implementation, the motor controller 125 provides closed-loop control of the motor performance by comparing one or more feedback values 118 with the desired profile or setpoint 128, and adjusts the control signal(s) 125a accordingly. In the illustrated motor drive power conversion system 110, the DC link inductor or choke 50 serves to provide a common mode DC link to smooth the DC power switched by the output switches 112 and to suppress common-mode voltages in the motor windings, thereby reducing the amount of input-related switching noise and transients seen at the motor load 20, although the various aspects of the invention are not restricted to the illustrated system 10, and the invention may be alternatively implemented in conjunction with other power conversion architectures. Moreover, the switching devices 112 in switching type conversion system 110 may be any type of electrical switching devices such as SCRs, IGBTs, IGCTs, etc.

The motor drive 40 employs one or more feedback signals or values 118, which may be sensed or measured condition associated with the power conversion system 110, including but not limited to measured voltages, currents, switch states, contactor feedback, measured line input voltages or currents, etc., and can also include information derived or calculated from sensed or measured values, such as estimated motor speed, torque, motor winding temperatures, suspected short circuits, etc. Such information can be used for closed-loop control purposes, and one or more such information values may be provided to external systems via I/O or communications interfaces (not shown). In addition, one or more of the feedback values 118 may be captured by the information capture system 150 for non-volatile storage as described further below. In this regard, the motor drive 40 may include various forms of feedback components, including but not limited to signal conditioning circuitry, sensors, computational components for deriving speed, torque, or other information from sensed signals, isolation components, analog-to-digital converters, etc. (not shown), wherein the detail of such circuitry is omitted so as not to obscure the various aspects of the present invention.

The motor control system 120 can be implemented as any suitable hardware, software, programmable logic, or combinations thereof, with the motor controller 125 operative as any suitable controller or regulator 125 by which the motor 20 is controlled according to the desired profile(s) or setpoint(s) 128 and (for closed-loop operation) according to the feedback 118. In this regard, the exemplary motor controller 125 can be operated in a number of different modes or control schemes, including controlling torque, speed, position, etc., although the particular motor control scheme or application is not a strict requirement of the present invention. The switch control system 124 is operative to provide appropriate switching signals 122 to operate the motor 20 in accordance with the motor control output(s) 125*a*, wherein the switch controls 124 may provide pulse width modulation (PWM) or other forms of switch timing control. The controller 125, moreover, is preferably programmable and operates according to firmware, wherein the closed or open-loop control provided by the controller 125 and the output(s) 125*a* generated thereby are the result of one or more firmware programs.

In accordance with several aspects of the present invention, the information capture system 150 is provided in the motor drive 40, which may be implemented in hardware, software, firmware, logic, etc., or combinations thereof, and which captures motor drive information via an information capture component 152 and stores the information in a non-volatile memory 154. The memory component 154 and the capture component 152 may be separate components or may be implemented in a single component or system, or one or both of the components 152, 154 may be integrated with one or more other devices or components of the motor drive system 40. FIG. 1 illustrates one possible embodiment, in which the capture system 150 is implemented as part of the motor control system 120, for example, in an FPGA or other programmable logic implementing I/O, data conversion, and other functions in the motor drive, with operative coupling to the motor controller 125 and the switching type power conversion system 110, although the invention is not restricted to this or any other exemplary embodiment. Other possible embodiments are illustrated and described further hereinafter in connection with FIGS. 2-3C.

In the illustrated embodiments, moreover, the information capture system is operable to capture and store one or more of the feedback values 118, and/or control values obtained from the controller 125, so as to preserve any suitable set of motor drive state values and plant condition values in case of a system shut down or fault condition, where any set of such values, states, motor controller output values 125*a*, or other information is referred to herein as motor drive information. In one possible implementation, for instance, the system 150 can be configured to capture and store one or more of a voltage value, a current value, a control input value 125*a*, a digital I/O value, a firmware value from the control system 120, and/or a control system firmware state from the controller 125. The particular value or values to be stored, moreover, can be a programmable parameter or parameters of the information capture system 150. In addition, the amount of motor drive information captured should preferably be sufficient to reconstruct the events leading to the triggering event, and may depend on the type of information being captured, wherein different sampling rates may be used for different signals. In this regard, the system 150 may be operative to sample slowly changing analog signals at a slower rate then a digital (e.g., discrete) signals or fast changing signals. Moreover, the captured information may be time stamped and hence need not be captured or sampled at a periodic rate.

The motor information captured by the system 150 may include any form of real time values, including but not limited to feedback values from the power conversion system 110 and/or control signal values such as analog input/outputs, discrete input/outputs, parameter setpoints, internal operating variables, which may include voltages, currents, control input values, firmware values from the control system 120, and/or a control system firmware state, etc., some or all of which may not be visible to a user terminal. In addition, the system 150 may capture and store one or more indicia of supplemental events that have occurred in the motor drive system 40 prior to the triggering event, where such information may be, for instance, the current state of a value which has not changed since the timestamp value. Examples of such supplemental information include without limitation firmware updates, firmware revision level, time stamped or unstamped indications of a user pressing a reset button or other motor drive user interface control implement, drive start and drive stop operations (e.g., time stamped), changes to data in a real time clock of the motor drive system 40, cycling of power, retentive alarm queues (e.g., cannot be cleared by a user), loss of parameter data, changes to significant setup parameters, etc.

In the illustrated motor drive 40, the information capture system 150 captures and stores a given amount of the desired motor drive information until a trigger event occurs (and possibly for a predetermined time thereafter), where the occurrence of such trigger events is indicated to the system 150 by one or more signals or messages 156, and the system 150 thereafter maintains the stored motor drive information in the non-volatile memory component 154, which itself may be removable or externally accessible for downloading the saved information for analysis and troubleshooting on or off-site. In this manner, the information may be quickly made available to service personnel associated with the motor drive manufacturer for analyzing the cause (and/or effects) of a particular triggering event. In one exemplary embodiment, the trigger event may be a motor drive fault condition, a watchdog timer condition in the control system 120, and/or a preconfigured condition in the control system 120, including but not limited to a firmware programmed state of the motor controller 125, etc. In this regard, the information capture system 150 (e.g., the capture component 152) may itself implement a watchdog timer with a programmable timeout period, and the controller 125 may be configured to periodically or repeatedly signal the capture component 152 to reset the watchdog timer, with the capture component operating to self-trigger in the event the internal watchdog timer times out due to lack of response from the controller 125 or other signaling source. The trigger signal(s)/message(s) 156 (including watchdog timer related signaling/messaging), moreover, can be provided by the control system 120 or components thereof (e.g., the motor controller 125), and/or such trigger signal(s)/message(s) 156 can be provided by an external device or system, wherein the system 150 can include one or more communications interfaces for receiving such signaling 156 in the form of messages from an external device via wired or wireless communications, network interfaces, or analog or digital signal I/O interfaces for receiving the triggering signal(s)/message(s) 156, and such interfaces may facilitate subsequent transfer of stored information from the non-volatile memory component 154 to such an external device via suitable communications interfaces. In this respect, any form of non-volatile memory 154 can be employed within the scope of the invention, including but not limited to battery backed RAM, flash memory, ferroelectric memory, etc., and the non-volatile memory component 154 may preferably be removable from the motor drive system 40, such as a USB memory key in one example.

Figure 2:
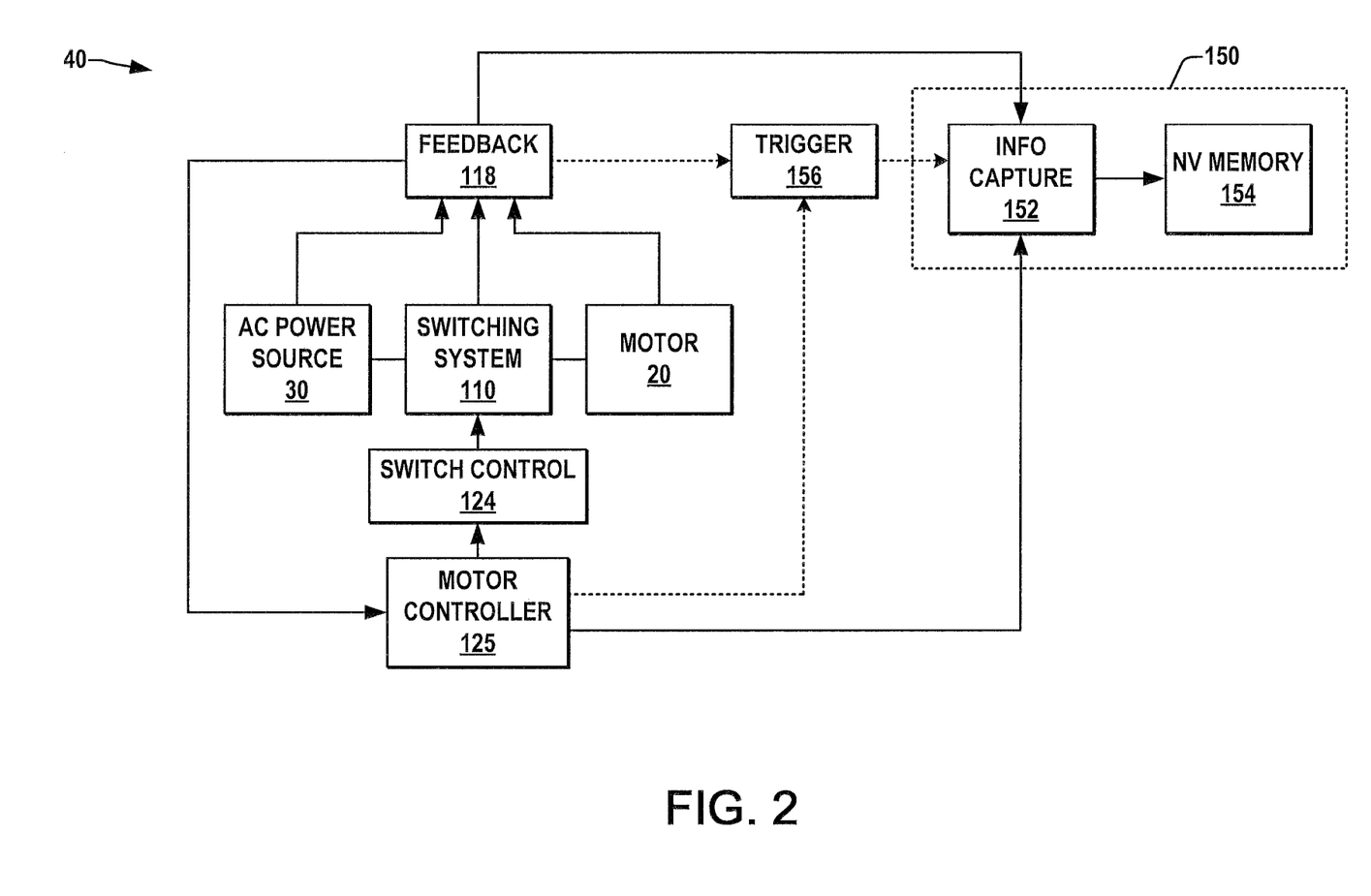
FIG. 2 is a simplified schematic diagram illustrating on exemplary implementation of the motor drive and information capture system of FIG. 1 with an information capture component obtaining motor drive information from the power conversion system and/or from a motor controller.

Referring also to FIG. 2, an exemplary implementation of the motor drive 40 and information capture system 150 is shown, in which the information capture component 152 obtains motor drive information from the power conversion system 110 and/or from the motor controller 125. In one possible embodiment of this type, the motor controller 125 can be implemented as a microprocessor, microcontroller, logic, etc. that receives the feedback 118 from the switching power conversion system 110, and in turn, the information capture component 152 obtains the motor drive information at least partially from the control system processor 125. In this example, the feedback values 118 can be provided to the capture component 152 by the controller 125 or such may be obtained directly from the power conversion system 120, or combinations thereof, with the motor controller processor 125 providing the control signal value(s), control program state information, or other additional drive information directly to the capture component 152 for non-volatile storage. In this implementation, moreover, the trigger signal(s)/message(s) 156 may be provided to the capture system 150 by one or both of the feedback system 118 and/or the controller 125.

Figure 3A:
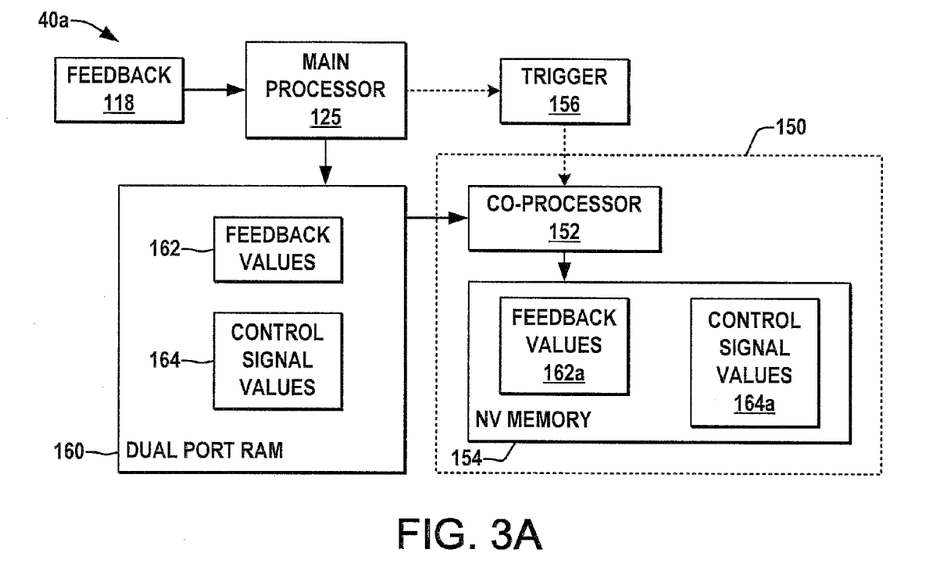
FIG. 3A is a schematic diagram illustrating another embodiment of the motor drive in which the main processor of the motor control system shares a dual port memory with a co-processor implementing the information capture device, which obtains the motor drive information from the dual port memory and stores the information into a non-volatile memory.

FIG. 3A illustrates another exemplary embodiment of the motor drive 40a, where the main processor 125 of the motor control system 120 shares a dual port memory 160 (e.g., dual port RAM) with the information capture system 150, with the information capture component 152 being implemented as a software/firmware operated co-processor 152 that obtains the motor drive information at least partially from the dual port memory 160 and stores the information into a separate non-volatile memory 154. In this regard, the main processor or motor controller 125 may obtain feedback values 162 from the feedback system 118 and store these into the dual port RAM 160 together with control signal values 164 (e.g., control inputs 125a, control program states, firmware states or values, error values, breakpoint information, etc.). The co-processor implemented information capture device 152 periodically obtains this motor drive information 162, 164 and stores copies 162a, 164a thereof into the non-volatile memory 154, wherein this implementation allows the motor controller 125 and information capture system 150 to operate independently and asynchronously with respect to one another, while allowing the information capture and storage advantages of the present invention without impacting the motor drive control performance of a given motor drive system 40a. Moreover, in the implementation, the main processor 125 may provide the triggering signaling/messaging 156 to the capture system 150, and/or such may be obtained from other devices or systems.

Figure 3B:
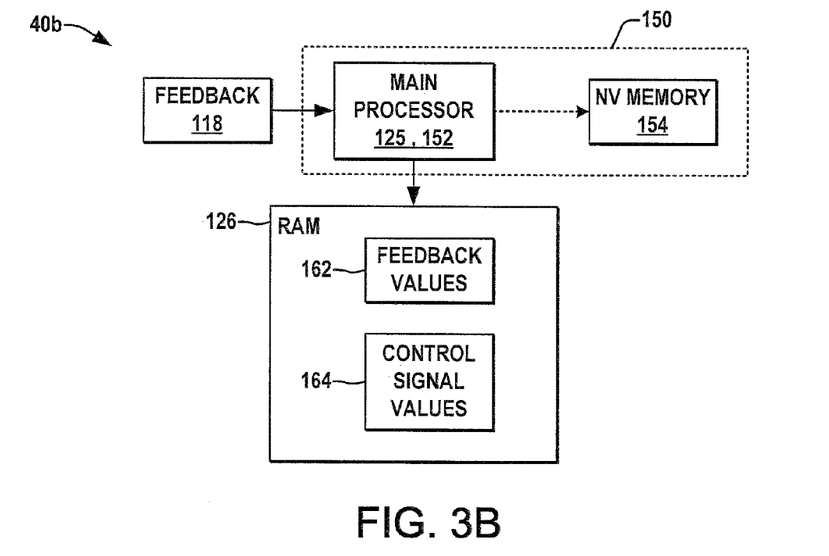
FIG. 3B is a schematic diagram illustrating another exemplary implementation of the motor drive system, wherein the information capture device is implemented in the main processor of the control system.

Referring also to FIG. 3B, another possible embodiment of the motor drive system 40b is shown in which the information capture device 152 is implemented in the main processor 125 of the control system 120. In this configuration, the main processor 125, 152 may maintain the feedback and control values 162, 164 in a normal RAM memory 126 and may also store all or some of such motor drive information into a separate non-volatile memory 154, wherein the main processor 125, 152 and the non-volatile memory 154 constitute the information capture system 150 in this example. In this case, moreover, the trigger signaling can be implemented internally to the processor 125, 152, and the processor 125, 152 may also be operable to receive external triggering event signaling and/or messaging (not shown).

Figure 3C:
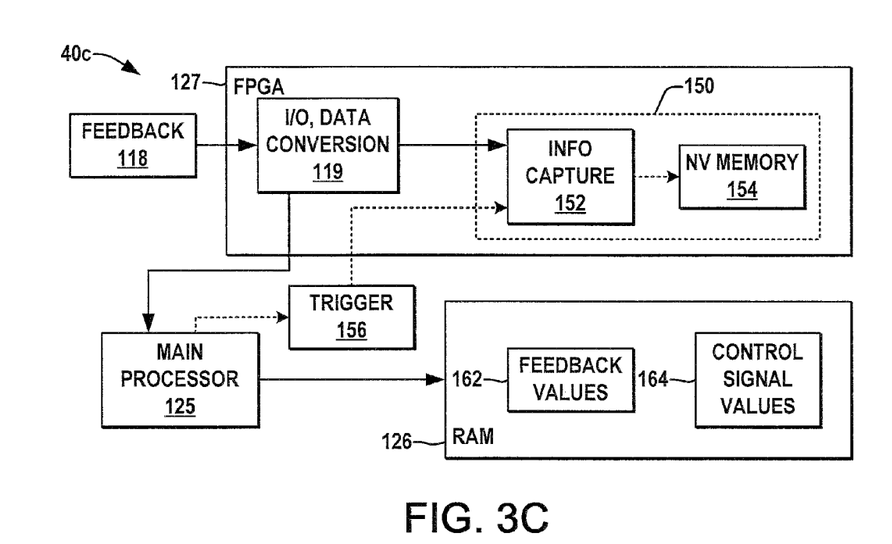
FIG. 3C is a schematic diagram illustrating yet another motor drive embodiment in which the information capture component is implemented in a programmable logic device along with an I/O and information conversion system that receives feedback values and provides the values to the information capture component and to the control system processor.

FIG. 3C depicts yet another motor drive embodiment 40c in which the information capture component 152 is implemented in a programmable logic device (e.g., FPGA) 127 along with an I/O, data conversion system 119 that receives feedback values 118 and receives/generates one or more I/O values (e.g., contactor feedback, motor winding temperature sensor inputs, etc.) and provides such values to the information capture component 152 as well as to the control system processor 125. In this example, the information capture component 152 can at least partially obtain the motor drive information from an I/O component of the control system 120. It is noted in this implementation that an existing programmable logic component 127 may be configured to perform the information capture functionality 152 described herein, and may also provide the non-volatile memory storage 154 or access to a removable non-volatile memory component 154, wherein the feedback can be obtained in this example by the capture component 152 without intervention by the main processor 125, and the trigger signaling/messaging 156 can be provided by the main processor 125 and/or by external sources. The above described examples thus provide motor drive systems 40 as well as systems 150 for capturing information in a motor drive 40 having an information capture system 150 with an information capture component 152 operative to capture motor drive information until a trigger event occurs and a non-volatile memory component 154 operatively coupled with the information capture system 150 to receive and store the captured information.

Figure 4:
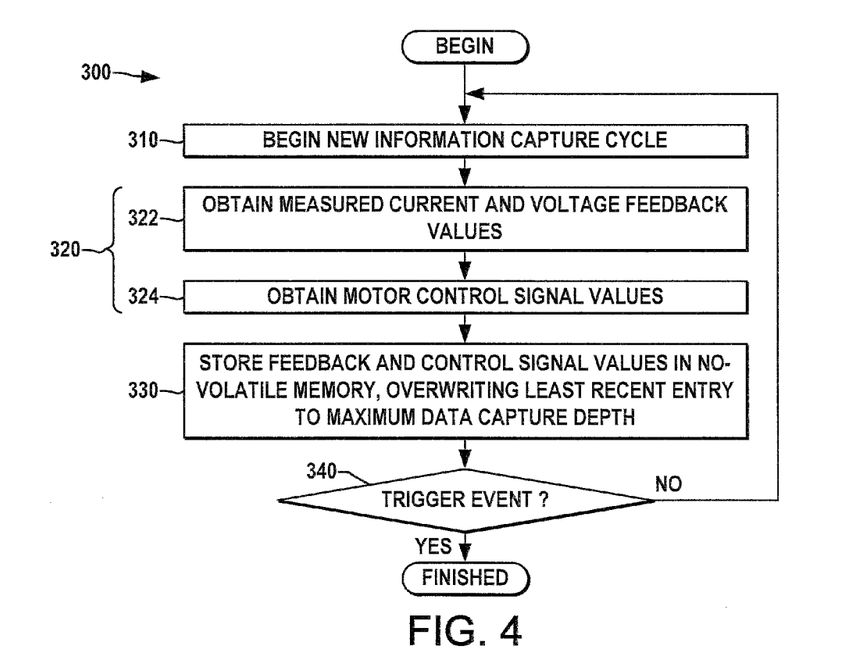
FIG. 4 is a flow diagram illustrating exemplary operation of the information capture systems in accordance with further aspects of the invention.

FIG. 4 provides a flow diagram 300 illustrating exemplary operation of the information capture systems in accordance with further aspects of the invention. Although the exemplary methods of the invention are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Further, the methods according to the present invention may be implemented in association with the above described motor drive systems as well as in association with other systems not illustrated. The methods of the invention in general involve operating an electric motor (e.g., motor 30 above) by provision of electrical power from a power source (e.g., source 30) to the motor using a power conversion system (e.g., system 110), and controlling the power conversion according to at least one desired profile or setpoint (e.g., profile(s)/setpoint(s) 128 in FIG. 1) using a control system (e.g., system 120). Moreover, the methods include capturing motor drive information from the power conversion system and/or the control system, as well as storing a given amount of the captured information in a non-volatile memory (e.g., memory 154) at least until a trigger event occurs.

FIG. 4 illustrates the information capture and storage operation of the exemplary motor drive system 40 above, and in particular the operation of the information capture system 150 thereof during motor drive operation, in which a new information capture cycle begins at 310, and the capture and storage proceeds at 320. In one example at 322, measured current and voltage feedback values are obtained, such as power source voltage levels, motor currents or phase voltages, etc., and motor control values are obtained at 324, for instance, control input signal values, control program states, controller firmware values or states, etc. Any type or form of motor drive information may be captured or obtained at 320, including but not limited to a feedback value (e.g., a voltage value, a current value, etc,), and/or one or more control signal values, for instance, a control input value (e.g., control signals or values 125a in FIG. 1 above), a digital I/O value (e.g., FIG. 3C above), a firmware value from the control system, a control system firmware state, etc. The feedback and control values are then stored at 330 into non-volatile memory, with the least recent entries of the memory being preferably overwritten in the example with the newly obtained information, such that the non-volatile memory at any particular time maintains a given amount of the most recent motor drive information.

A determination is made at 340 as to whether a trigger event has occurred, such as a motor drive fault condition, a watchdog timer condition in the control system, a preconfigured condition in the control system, or any other event or condition associated with the motor drive system or an external event signaled (or indicated by messaging) to the information capture system. If no trigger event has occurred (NO at 340), the method returns to 310, 320 as described above. Although illustrated as a sequential flow diagram 300, it will be appreciated that the determination at 340 may occur asynchronously from the information capture and storage steps 320, such as where the trigger is used as an interrupt to a firmware/software based implementation of the information capture system. Once a trigger event occurs (YES at 340), the information capture and storage ends, whereafter the captured information can be accessed to allow understanding of the state of the motor drive system and the operating environment in a period of time leading up to the triggering event. It is noted that in certain cases, the receipt of a triggering event may be used by the information capture system to cease further information capture and storage, or a certain number of further captures may be undertaken, or in other cases, the event may relate to loss of control power or other situation in which further information capture and storage may not be possible.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed is:

1. A motor drive system for operating an electric motor, the motor drive system comprising:
    a power conversion system operative to selectively provide electrical power from a power source to an electric motor according to at least one control input;
    a control system providing the control input to the power conversion system for controlling operation of the electric motor; and
    an information capture system comprising:
        an information capture component operative to capture motor drive information in real time, wherein the captured motor drive information includes at least one of a firmware value from the control system, a firmware state from the control system, control program states from the control system, and breakpoint information from the control system, and
        a non-volatile memory component to store the captured information in real time,
    wherein the non-volatile memory component is removable from the motor drive system,
    wherein the non-volatile memory component is a USB memory key.

2. The motor drive system of claim 1, wherein the power conversion system comprises a switching system with a plurality of switching devices coupled between the power source and the electric motor; and wherein the control system comprises a motor controller providing a motor controller output for controlling the motor operation according to at least one desired profile or setpoint, and a switch control circuit providing a plurality of switch control signals to control operation of the switching devices of the switching system according to the controller output.

3. The motor drive system of claim 1, wherein the information capture system is operative to capture and store a given amount of motor drive information at least until a trigger event occurs and to thereafter maintain the stored information in the non-volatile memory component.

4. The motor drive system of claim 3, wherein the trigger event is one of a motor drive fault condition, a watchdog timer condition in the control system, and a preconfigured condition in the control system.

5. The motor drive system of claim 3, wherein the control system provides a trigger signal to the information capture component.

6. The motor drive system of claim 1, wherein the captured and stored motor drive information comprises at least one of a feedback value from the power conversion system and a control signal value.

7. The motor drive system of claim 6, wherein the captured and stored motor drive information comprises at least one of a voltage value, a current value, a control input value, a digital I/O value, a firmware value from the control system, and a control system firmware state.

8. The motor drive system of claim 1, wherein the information capture component obtains the motor drive information at least partially from a processor of the control system.

9. The motor drive system of claim 1, wherein the information capture component obtains the motor drive information at least partially from a processor of the control system.

10. The motor drive system of claim 1, wherein the information capture component is a processor of the control system.

11. The motor drive system of claim 1, wherein the information capture component obtains the motor drive information at least partially from an I/O component of the control system.

12. A motor drive system, comprising:
  a switching type power conversion system including a plurality of electrical switching devices operative according to switching control signals to convert input electrical power to output electrical power for driving a motor load; and
  a switch control system operative to provide the switching control signals to the power conversion system based on at least one control input signal;
  a motor control system including:
    a motor controller receiving at least one feedback value from the power conversion system and providing the at least one control input signal to the switch control system in order to implement a desired motor operation according to at least one setpoint and the at least one feedback value,
    an information capture component operatively coupled with the motor controller and operative to capture feedback values and other motor drive information from the motor controller in real time, the captured motor drive information including at least one of a firmware value from the controller, a firmware state from the controller, control program states from the controller, and breakpoint information from the controller, and
    a non-volatile memory component operatively coupled with the information capture component to store the captured motor drive information in real time and removable from the motor drive system to facilitate troubleshooting and analysis of motor faults or motor drive faults, wherein the non-volatile memory component is a USB memory key.

* * * * *